(12) United States Patent
Thompson et al.

(10) Patent No.: US 11,299,263 B2
(45) Date of Patent: Apr. 12, 2022

(54) AUTOMATIC, ACTIVE BLADE TRACKING AND BALANCE SYSTEM

(71) Applicant: Bell Helicopter Textron Inc., Fort Worth, TX (US)

(72) Inventors: Terry K. Thompson, Bedford, TX (US); Kyle Thomas Cravener, Watauga, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 188 days.

(21) Appl. No.: 15/372,072

(22) Filed: Dec. 7, 2016

(65) Prior Publication Data

US 2018/0155015 A1   Jun. 7, 2018

(51) Int. Cl.
*B64C 27/00* (2006.01)
*B64C 27/57* (2006.01)
*B64C 11/30* (2006.01)
*B64C 11/34* (2006.01)

(52) U.S. Cl.
CPC ............ *B64C 27/008* (2013.01); *B64C 27/57* (2013.01); *B64C 11/301* (2013.01); *B64C 11/34* (2013.01)

(58) Field of Classification Search
CPC ....... B64C 27/008; B64C 27/54; B64C 27/57; B64C 9/30
See application file for complete search history.

(56) References Cited

U.S. PATENT DOCUMENTS

| | | | |
|---|---|---|---|
| 2,754,917 A | | 7/1956 | Kee |
| 3,144,908 A | * | 8/1964 | Pascher .................... B64C 27/54 |
| | | | 416/114 |
| 3,584,814 A | * | 6/1971 | Murphy ............... G05D 1/0808 |
| | | | 244/178 |
| 3,938,762 A | * | 2/1976 | Murphy ................ B64C 27/001 |
| | | | 73/462 |

(Continued)

FOREIGN PATENT DOCUMENTS

| | | |
|---|---|---|
| EP | 3333071 A1 | 6/2018 |
| IN | 201406475 I4 * | 7/2016 |

(Continued)

OTHER PUBLICATIONS

Williams et al., "Airworthiness and flight characteristics test (A&FC) of the BHTI 214ST Helicopter," Dec. 23, 1986, USAAEFA Project No. 85-10.*

(Continued)

*Primary Examiner* — Russell Frejd
*Assistant Examiner* — Sara J Lewandroski
(74) *Attorney, Agent, or Firm* — Edwin S. Flores; Daniel J. Chalker; Chalker Flores, LLP

(57) ABSTRACT

The present invention includes an apparatus and method for automatically adjusting the tracking of one or more blades comprising: a blade tracking adjustment mechanism connected to one or more blades of an aircraft; a blade tracking measurement system that measures the tracking of the one or more blades; and a computer that receives an output from the blade tracking measurement system with tracking information for each of the one or more blades; wherein the computer outputs instructions for the blade tracking adjustment mechanism to change a pitch of one or more of the blades to correct blade tracking.

18 Claims, 8 Drawing Sheets

(56) References Cited

U.S. PATENT DOCUMENTS

| | | | |
|---|---|---|---|
| 3,999,888 A | 12/1976 | Zincone | |
| 5,026,254 A | 6/1991 | Ford et al. | |
| 5,273,398 A | 12/1993 | Reinfelder et al. | |
| 5,314,308 A | 5/1994 | Reed, III | |
| 5,511,944 A * | 4/1996 | Ide | B64C 27/72 416/61 |
| 6,322,324 B1 * | 11/2001 | Kennedy | B64C 27/008 416/500 |
| 7,097,427 B2 | 8/2006 | Kuhns et al. | |
| 2002/0095242 A1 | 7/2002 | Bechhoefer | |
| 2006/0237581 A1 * | 10/2006 | Gerbino | B64C 27/26 244/17.11 |
| 2010/0047067 A1 * | 2/2010 | Houser | B64C 27/615 416/31 |
| 2011/0191040 A1 * | 8/2011 | Bechhoefer | B64C 27/008 702/56 |
| 2013/0221153 A1 * | 8/2013 | Worsham, II | B64C 27/605 244/17.13 |
| 2014/0145025 A1 * | 5/2014 | Fang | B64C 27/008 244/17.11 |
| 2015/0073627 A1 * | 3/2015 | Fang | B64C 27/008 701/3 |
| 2015/0132132 A1 * | 5/2015 | Welsh | B64C 27/008 416/145 |
| 2015/0308407 A1 * | 10/2015 | Kyrazis | F03D 17/00 416/41 |
| 2015/0355325 A1 * | 12/2015 | Bechhoefer | G01S 13/50 342/118 |
| 2016/0236773 A1 * | 8/2016 | Jolly | B64C 27/001 |
| 2016/0257399 A1 * | 9/2016 | Carter, Jr. | B64C 27/59 |
| 2016/0298691 A1 * | 10/2016 | Dowie | F16C 7/06 |
| 2017/0217583 A1 * | 8/2017 | Halcom | B64C 27/78 |
| 2018/0072412 A1 * | 3/2018 | Buesing | B64C 27/32 |
| 2019/0193835 A1 * | 6/2019 | Sandberg | B64C 11/34 |

FOREIGN PATENT DOCUMENTS

| | | |
|---|---|---|
| WO | 2003011689 | 2/2003 |
| WO | 2009085639 A1 | 7/2009 |
| WO | 2012021202 A2 | 2/2012 |
| WO | 2012021202 A3 | 2/2012 |

OTHER PUBLICATIONS

U.S. Department of Transportation Federal Aviation Administration, Helicopter Flying Handbook, Chapter 4: Helicopter Components, Sections, and Systems, 2012, FAA-H-8083-21A (Year: 2012).*
Renzi, An Assessment of Modern Methods for Rotor Track and Balance, 2004, Air Force Institute of Technology (Year: 2004).*
European Patent Office, European Search Report for EP Appl. No. 17203208.8 dated Feb. 13, 2018, 4 pp.
European Patent Office, Communication pursuant to Article 94(3) EPC for EP Appl. No. 17203208.8 dated Mar. 2, 2018, 6 pp.
European Patent Office, Communication pursuant to Article 94(3) EPC for EP Appl. No. 17203208.8 dated Oct. 2, 2018, 4 pp.
European Patent Office, Communication pursuant to Article 94(3) EPC for EP Appl. No. 17203208.8 dated Mar. 15, 2019, 4 pp.

* cited by examiner

AUTOMATIC, ACTIVE BLADE TRACKING AND BALANCE SYSTEM

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of blade tracking, and more particularly, to an automatic, active blade tracking apparatus and method.

BACKGROUND OF THE INVENTION

Without limiting the scope of the invention, its background is described in connection with blade tracking.

U.S. Pat. No. 7,097,427, issued to Kuhns, et al., and entitled "Helicopter main rotor blade balance weight retention assembly", is said to teach a helicopter main rotor blade balance weight retention system and assembly that includes a base plate, at least one support post integral with the base plate that extends out perpendicularly from the base plate, a plurality of balance weights, a retaining nut plate, and one or more fastening bolts for securing the balance weights to the base plate, and the base plate to the rotor blade. The balance weights can include apertures through which the support posts and the fastening bolts pass. The weight retention assembly can be installed into pockets in the blade tip.

U.S. Pat. No. 5,026,254, issued to Ford, et al., and entitled "Calibrated pitch change link" is said to teach a calibration device for a pitch change link for a helicopter rotor grip, where the link includes a bearing and a plurality of sequential reference numbers equally spaced apart and concentrically disposed around the link. An indexing device is mounted to the bearing and is disposed adjacent to the plurality of sequential reference numbers for locating one of the plurality of reference numbers representing the length of the link. The indexing device includes a window, which indexes one of the plurality of reference numbers as the link rotates.

SUMMARY OF THE INVENTION

In one embodiment, the present invention includes an apparatus for automatically adjusting the tracking of one or more blades comprising: a blade tracking adjustment mechanism connected to one or more blades of an aircraft; a blade tracking measurement system that measures the tracking of the one or more blades; and a processor that receives an output from the blade tracking measurement system with tracking information for each of the one or more blades, wherein the processor controls the blade tracking adjustment mechanism to change a pitch of at least one of the one or more of the blades to adjust the tracking of at least one of the one or more blades. In one aspect, the processor is a flight control computer. In another aspect, the blade tracking adjustment mechanism is permanently attached to the aircraft. In another aspect, the aircraft is a helicopter, a rotorcraft, or a vertical take off and landing rotorcraft. In another aspect, the apparatus further comprises an eccentric pitch horn clevis is adjusted by the blade tracking adjustment mechanism under the control of the processor. In another aspect, the blade tracking adjustment mechanism is a rotor analysis and diagnostic system. In another aspect, the blade tracking adjustment mechanism adjusts at least one of the blade trim tabs, blade weights, and/or blade control rods. In another aspect, the apparatus further comprises a hub balance adjustment mechanism communicably coupled to the processor, wherein the hub balance adjustment mechanism balances at least one of the one or more blades. In another aspect, the apparatus further comprises a hub balance adjustment mechanism communicably coupled to the processor, wherein the hub balance adjustment mechanism balances one or more blades is automatically adjusted in addition to, or concurrently with, the pitch of at least one of the one or more blades.

In another embodiment, the present invention includes a method for automatically adjusting the tracking of one or more blades comprising: providing a blade tracking adjustment mechanism connected to one or more blades of an aircraft, a blade tracking measurement system communicably coupled to the blade tracking adjustment mechanism, and a processor communicably coupled to the blade tracking measurement system and the blade tracking adjustment system; measuring the tracking of at least one of the one or more blades using the blade tracking measurement system; determining whether a measured tracking of each of the one or more blades is within one or more specified operational parameter using the processor; adjusting the tracking of each blade with the measured tracking is not within the operational parameters; and changing the pitch of at least one of the one or more of the blades with the blade tracking adjustment mechanism based on an output received from the processor. In one aspect, the processor is a flight control computer. In another aspect, the method further comprises permanently attaching the blade tracking adjustment mechanism to the aircraft. In another aspect, the aircraft is a helicopter, a rotorcraft, or a vertical take off and landing rotorcraft. In another aspect, the method further comprises adjusting the tracking of the one or more blades at the eccentric pitch horn clevis with the blade tracking adjustment mechanism under the control of the processor. In another aspect, the blade tracking adjustment mechanism is a rotor analysis and diagnostic system. In another aspect, the method further comprises adjusting at least one of the blade trim tabs, blade weights, and/or blade control rods of the one or more blades using the blade tracking adjustment mechanism. In another aspect, the method further comprises adjusting a hub balance with a hub balance adjustment mechanism communicably coupled to the processor, wherein the hub balance adjustment mechanism balances the one or more blades. In another aspect, the method further comprises adjusting a hub balance with a hub balance adjustment mechanism communicably coupled to the processor, wherein the hub balance adjustment mechanism balances the one or more blades in addition to, or concurrently with, adjusting the pitch of the one or more blades.

In another embodiment, the present invention includes a method for automatically adjusting the tracking of one or more blades comprising: providing a blade tracking adjustment mechanism connected to one or more blades of an aircraft, a blade tracking measurement system communicably coupled to the blade tracking adjustment mechanism, and a processor communicably coupled to the blade tracking measurement system and the blade tracking adjustment system, and a hub balancing system connected to a blade balancing system that is communicably coupled to the processor; measuring the tracking of at least one of the one or more blades using the blade tracking measurement system; determining whether a measured tracking of each of the one or more blades is within one or more specified operational parameter using the processor; adjusting the tracking of each blade with the measured tracking is not within the operational parameters; determining whether a measured balance of each of the one or more blades is within one or more specified operational parameter using the processor; adjusting the balance of each blade with the measured balance is not within the operational parameters; and changing at least one of: the pitch of at least one of the one or more of the blades with the blade tracking adjustment mechanism based on an output received from the processor; or the balance of at least one of the one or more of the blades with the blade balancing system based on an output received from the processor.

In another embodiment, the present invention includes a non-transitory computer readable medium for automatically adjusting the tracking of one or more blades, comprising instructions stored thereon, that when executed by a computer having a communications interface, one or more databases and one or more processors communicably coupled to the interface and one or more databases, perform the steps comprising: providing a blade tracking adjustment mechanism connected to one or more blades of an aircraft, a blade tracking measurement system communicably coupled to the blade tracking adjustment mechanism, and a processor communicably coupled to the blade tracking measurement system and the blade tracking adjustment system; measuring the tracking of at least one of the one or more blades using the blade tracking measurement system; determining whether a measured tracking of each of the one or more blades is within one or more specified operational parameter using the processor; adjusting the tracking of each blade with the measured tracking is not within the operational parameters; and changing the pitch of at least one of the one or more of the blades with the blade tracking adjustment mechanism based on an output received from the processor.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
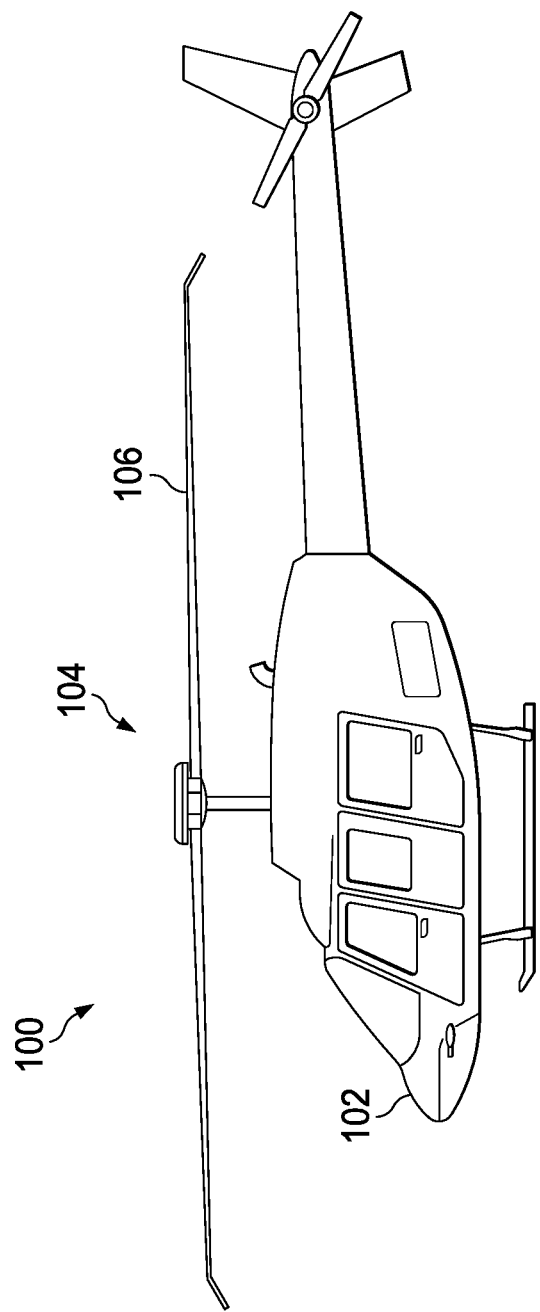
FIG. 1 shows a side view of a helicopter for use of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the term "dynamic balance" refers to a balancing system as a result of imbalance during movement. As used herein, the term "static balance" refers to balancing while stationary using a scale (moment balance). As used herein, the term "blade balance" refers to a method in which a blade is balance, which is usually done statically. During the blade balance, the blade is adjusted by adding/dropping weights with a dynamic rotor system. For example, a blade balance mechanism is put in blade to adjust dynamic rotor system balance. As used herein, the term "hub balance" refers to balancing the hub, which is usually performed statically. A hub balance mechanism can be put in hub to adjust the dynamic rotor system balance.

Blade tracking is an arduous, iterative, manual process. An active, automatic blade tracking system implemented into a rotor system would provide many advantages. First, initial blade tracking time can be cut down significantly. Current blade tracking methods are time consuming and require multiple manual iterations of pitch link adjustment to perfect rotor tracking. This requires the rotor to be stopped and started multiple times to complete tracking adjustment (rather than "on the fly" with an automatic system). Second, the tracking can be adjusted during flight/service to account for bearing wear. In one embodiment, an eccentric pitch horn clevis can be used in conjunction with a permanent onboard blade tracking system tied into, e.g., the aircraft flight control computer(s), to automatically adjust blade tracking.

The present invention can be used in conjunction with a blade tracking system, such as rotor analysis and diagnostic system (RADS), that is permanently installed onto the aircraft. The blade tracking system feeds data to the flight control computer, which would actively and automatically trigger the pitch control mechanism to adjust tracking. Any automated pitch control mechanism can be used with the present invention. The mechanism can be something similar to the BELL 214 ST pitch horn tracking adjuster. The BELL 214ST pitch horn uses an eccentric axis pitch horn clevis driven by an electric motor to adjust blade tracking. The electric motor rotates the pitch horn clevis to create an effectively shorter or longer pitch link length to adjust the individual blade tracking. Adjustment on a BELL 214ST is controlled by pilot input. The temporary RADS system uses sensors to track rotor blade position in conjunction with rotor azimuth sensors and accelerometers to determine blade specific pitch link adjustment.

Prior methods to control blade tracking are a completely manual process, generally completed during the initial hours of flight test for any given helicopter or tilt rotor. The present invention is an automatic, active, blade tracking system implemented using a permanently installed pitch control mechanism that corrects tracking under computer control, which can include during flight operations. Further, the present invention can be used with a balance control mechanism, which can also be permanently attached to the blades, and which can also be under the control of the computer.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles.

Figure 2A:
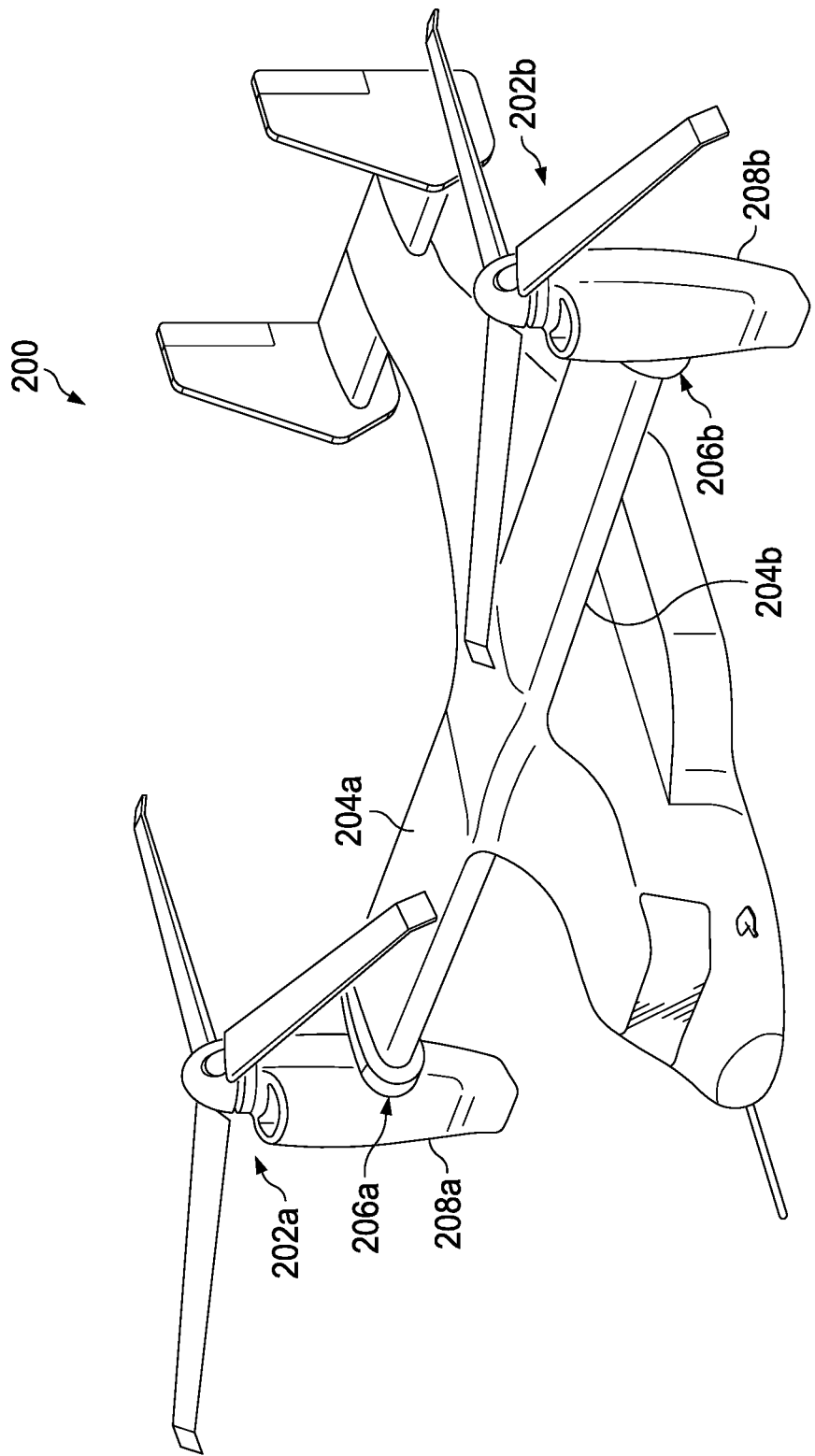
FIG. 2A shows a perspective view of tiltrotor aircraft that can use the present invention.

For example, FIG. 2A shows a tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which carry the engines and transmissions of tilt rotor aircraft 200. Tilt rotor assemblies 202a and 202b move or rotate relative to wing members 204a and 204b between a helicopter or hover mode in which tilt rotor assemblies 202a and 202b are tilted upward, such that tilt rotor aircraft 200 flies like a conventional helicopter; and an airplane or cruise mode in which tilt rotor assemblies 202a and 202b are tilted forward, such that tilt rotor aircraft 200 flies like a conventional propeller driven aircraft.

Figure 2B:
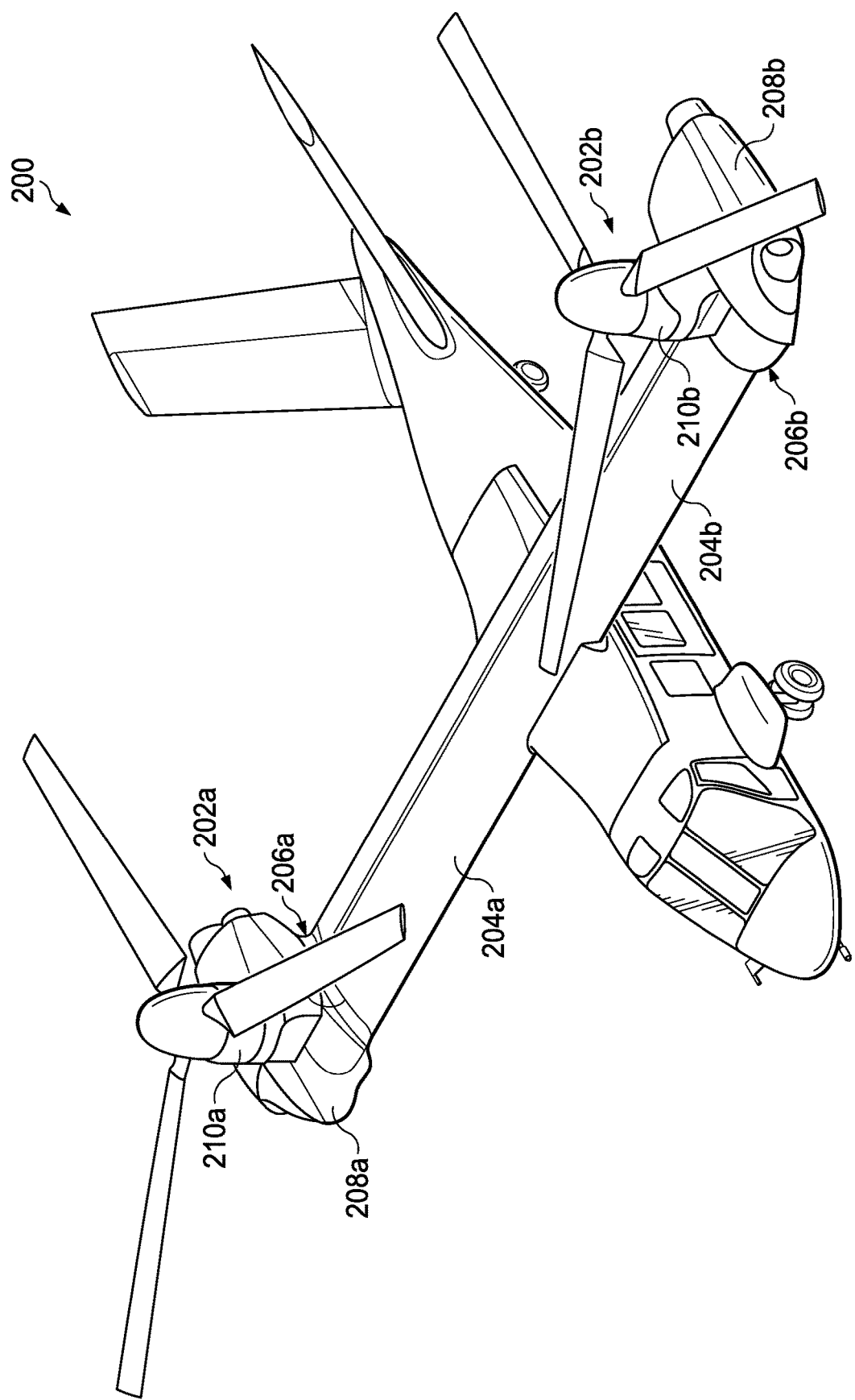
FIG. 2B shows another perspective view of tiltrotor aircraft that can use the present invention.

FIG. 2B shows another tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tilt rotor aircraft 200. In this embodiment, the engines are fixed to the wing and do not rotate, rather, only the pylons 210a and 210b with the rotor assemblies 202a and 202b rotates. Tilt rotor assemblies 202a and 202b move and rotate relative to wing members 204a and 204b and the nacelles 208a and 208b. The tilt rotor assemblies 202a and 202b do not more relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The rotorcraft 200 is still able to fly like a conventional helicopter; and an airplane or cruise mode in which on the rotors are tilted forward, such that tilt rotor aircraft 200 flies like a conventional propeller driven aircraft.

Figure 3:
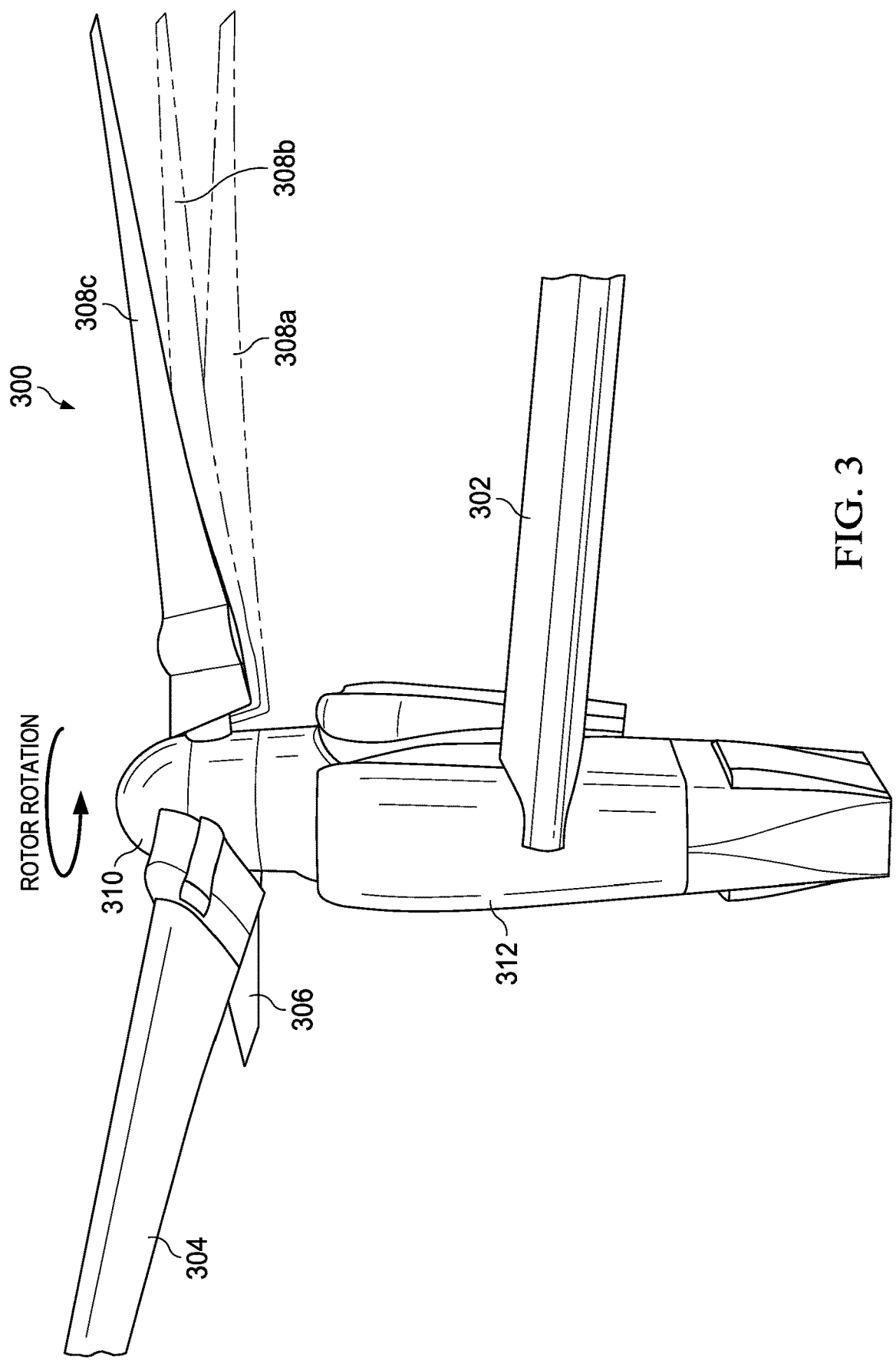
FIG. 3 shows a close-up view of a rotor assembly in relation to wing of a rotorcraft.

FIG. 3 shows a close-up view of a rotor assembly 300 in relation to wing 302, with a direction of rotor rotation. In this figure, three rotor blades are depicted, 304, 306, and 308a, 308b, 308c connected by hub 310 to engine 312. The skilled artisan will understand that a rotor assembly can include, 2, 3, 4, 5, 6, 7 or more blades. For purposes of explanation, the blade 308 is shown in three different positions, 308a, 308b, and 308c, with the large difference shown for exemplary and clarity purposes only. The blade 308b is tracking at the correct or proper position for the blade. The blades at position 308a and 308c are not in the correct position, leading to blade and/or rotor assembly instability. For example, blade 308c is out of tracking and is high with regard to the proper blade position 308b, while blade 308a is considered to be below with regard to the properly tracking blade 308b and blades 304 and 306. The present invention includes methods, devices, code segments that are used to determine the lack of blade tracking, and provides for a system that permits manual or automatic changes to correct blade tracking.

Figure 4:
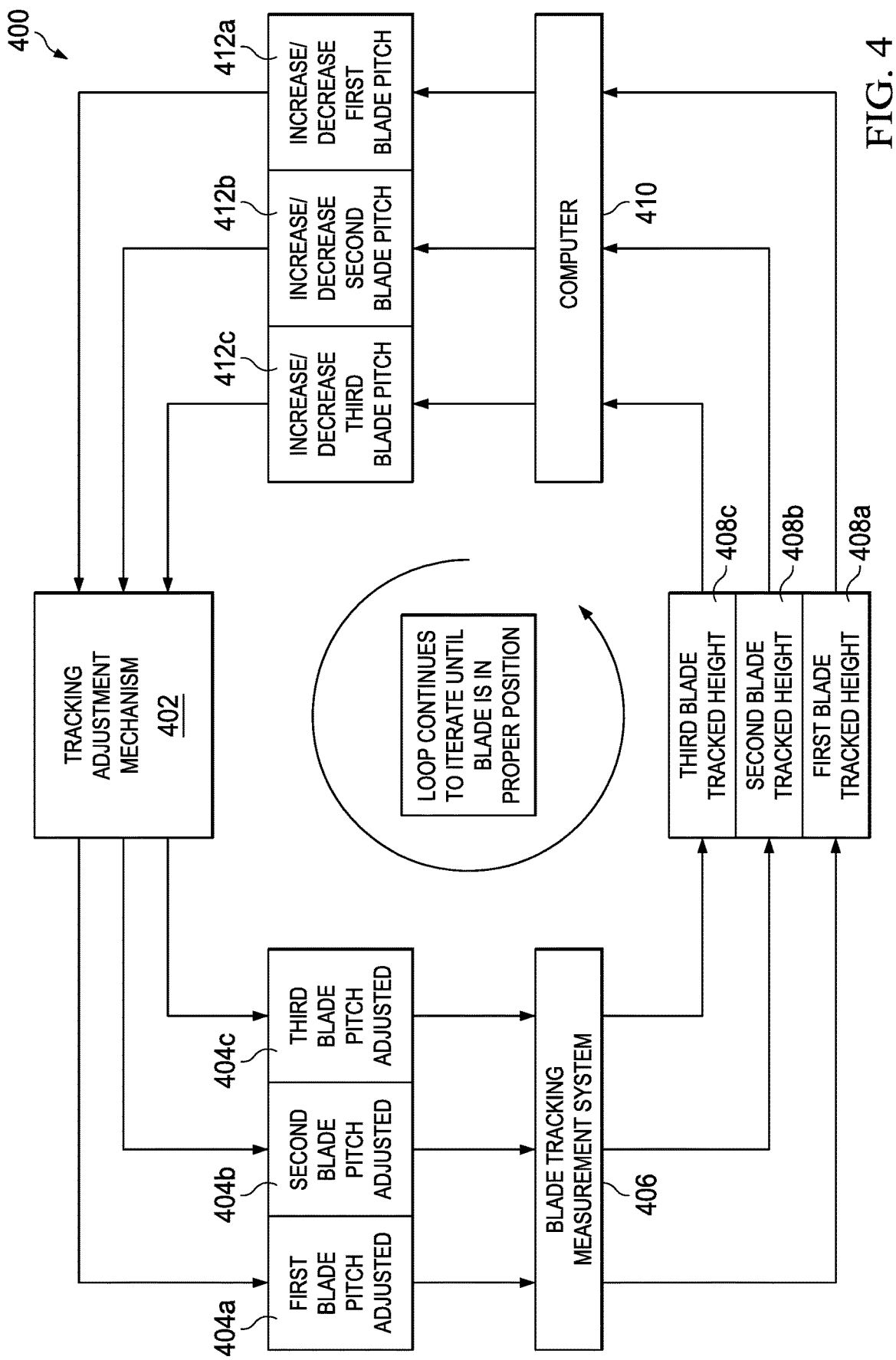
FIG. 4 shows one embodiment of the present invention, in which a blade tracking adjustment system that is used to measure, correct, and confirm proper blade tracking.

FIG. 4 shows one embodiment of the present invention, in which a blade tracking adjustment system 400 that is used to measure, correct, and confirm proper blade tracking. A tracking adjustment mechanism 402 is positioned to individually control blade tracking. In this example, the tracking adjustment mechanism 402 is used to adjust the pitch, as applicable, of one or more of the three blades: first blade 404a, second blade 404b, and/or third blade 404c, however, the skilled artisan will know that blade tracking can be adjusted for just one blade, two blades, three, four, or more blades as may be required. Next, a blade tracking measurement system 406 is used to measure the position of the first, second, or third blades and the tracking for each blade is output at 408a, 408b, and 408c, respectively. The tracking information 408a, 408b, and 408c is then input into a processor or computer 410, which can be a flight control computer, that determines if the blade is tracking correctly. The processor or computer 410 then outputs information or control signals regarding each of the blades, which includes, if applicable, increasing or decreasing the pitch of first, second, and/or third blades 412a, 412b, 412c, respectively, by directing the tracking adjustment mechanism 402 to adjust the pitch of one or more of the blades. The blade tracking measurement system 406 then measures the pitch of the blades and additional adjustments are made as necessary, which can be an iterative process until blade pitch is achieved or corrected. One advantage of the present invention is that blade pitch can be adjusted during flight operations.

Figure 5:
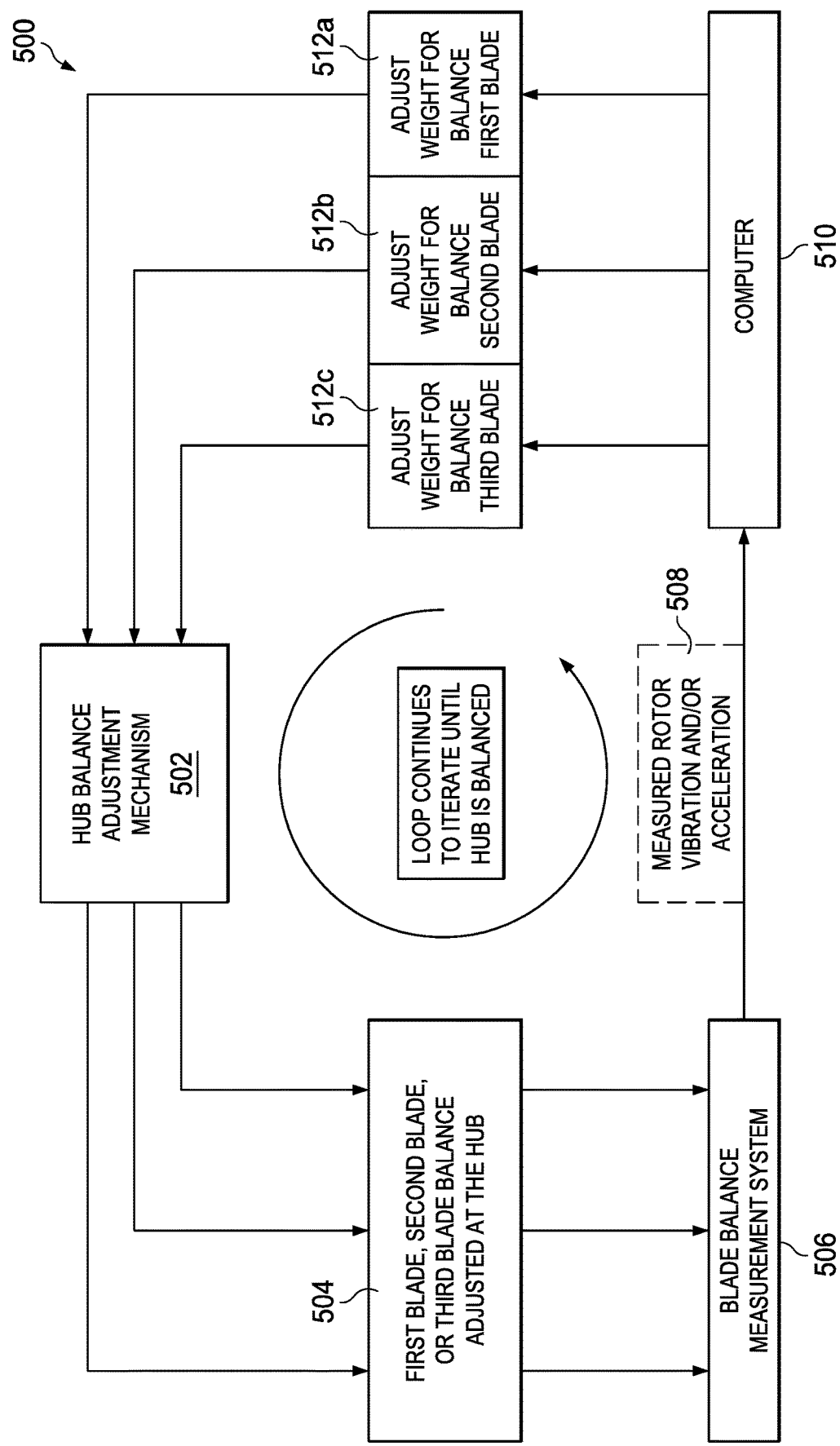
FIG. 5 shows another embodiment of the present invention, in which a rotor system balance adjustment system that is used to measure, correct, and confirm proper rotor system balance, which can operate alone or in conjunction with the blade tracking adjustment system.

FIG. 5 shows another embodiment of the present invention, in which a blade balance adjustment system 500 that is used to measure, correct, and confirm proper rotor system balance, which can operate alone or in conjunction with the blade tracking adjustment system of FIG. 4. A hub balance adjustment mechanism 502 is positioned to individually control rotor system balance however, the skilled artisan will know that blade tracking can be adjusted for just one blade, two blades, three, four, or more blades as may be required. In this example, the hub balance adjustment mechanism 502 is used to adjust the rotor system balance, as applicable, of one or more of the three blades 504. Next, a rotor system balance measurement system 506 is used to measure the balance of the blades and the output 508, which includes measured rotor vibration(s) and/or acceleration(s), which is/are input into a processor or computer 510, which can be a flight control computer, that determines hub vibration, acceleration and/or rotor system balance. The processor or computer 510 then outputs information or control signals regarding each of the blades, which includes, if applicable, adjusting the weight of the first blade, second blade, and/or third blade for balance 512a, 512b, 512c, respectively, by directing the hub balance adjustment mechanism 502 to adjust the balance of one or more of the blades. The rotor system balance measurement system 506 then measures the balance of the blades and additional adjustments are made as necessary, which can be an iterative process until hub balance is achieved or corrected. One advantage of the present invention is that hub balance can be adjusted during flight operations.

Figure 6:
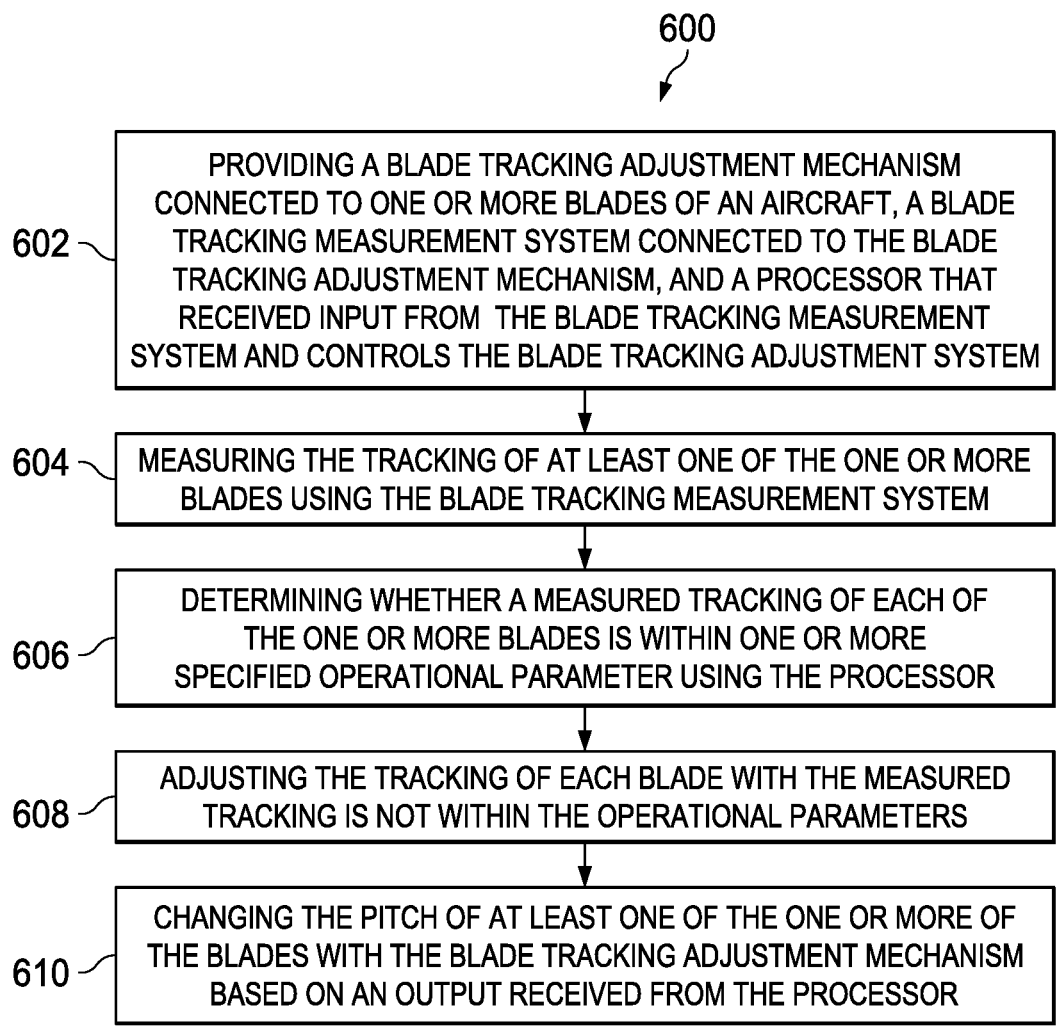
FIG. 6 shows a flow chart with a method of the present invention.

FIG. 6 shows a flow chart with one example of the method 600 for automatically adjusting the tracking of one or more blades of the present invention. At step 602, a blade tracking adjustment mechanism is provided that is connected to one or more blades of an aircraft, a blade tracking measurement system communicably coupled to the blade tracking adjustment mechanism, and a processor communicably coupled to the blade tracking measurement system and the blade tracking adjustment system. At step 604, the tracking of at least one of the one or more blades using the blade tracking measurement system is measured. At step 606, a measured tracking of each of the one or more blades is within one or more specified operational parameter using the processor is determined. At step 608, the tracking of each blade with the measured tracking is not within the operational parameters is adjusted. At step 610, the pitch of at least one of the one or more of the blades with the blade tracking adjustment mechanism based on an output received from the processor is changed.

Figure 7:
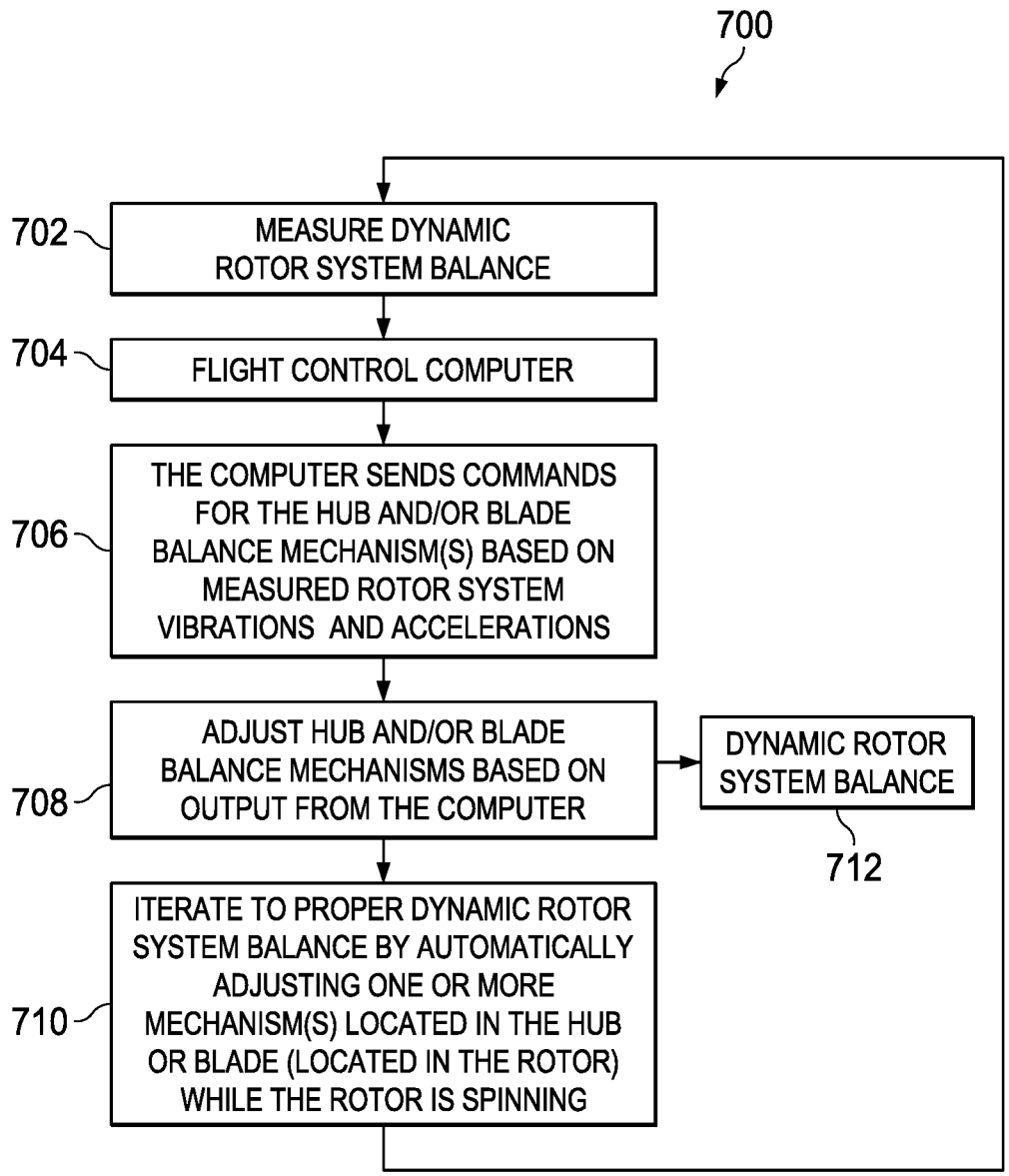
FIG. 7 shows another flowchart of certain details of the system and method present invention.

FIG. 7 shows a flowchart of certain details of the system and method for the dynamic rotor system balance 700 of the present invention. At step 702, a measurement is taken to measure an initial dynamic rotor system balance, which measurements are input into, e.g., a flight control computer 704. At step 706, the computer sends commands for the Hub and/or Blade Balance mechanism(s) based on measured rotor system vibrations and accelerations. At step 708, the Hub and/or Blade Balance mechanisms are adjusted based on output from the computer. At step 710, the method iterates to achieve proper dynamic rotor system balance by automatically adjusting one or more mechanism(s) located in the hub or blade (located in the rotor) while the rotor is spinning, and the dynamic rotor system balance is again measured. At step 712, the process ends once the dynamic rotor system balance is attained.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An apparatus for automatically adjusting a tracking of one or more blades of an aircraft comprising:
   a blade tracking adjustment mechanism connected to each individual blade of the one or more blades by a respective eccentric pitch horn clevis, wherein the blade tracking adjustment mechanism is communicably connected to a rotor hub, and wherein each blade is connected to the rotor hub by the respective eccentric pitch horn clevis, wherein each respective eccentric pitch horn clevis is rotated to create an effectively shorter or longer pitch link length to change a pitch to adjust a tracking of each individual blade;
   a blade tracking measurement system that measures the tracking of each individual blade of the one or more blades; and
   a processor that receives an output from the blade tracking measurement system with tracking information for each individual blade of the one or more blades and determines whether a measured tracking of each individual blade of the one or more blades is within a plurality of specified operational parameters, wherein the plurality of specified operational parameters includes specified operational parameters that define a desired out-of-track condition for at least one individual blade of the one or more blades;
   wherein the processor controls the blade tracking adjustment mechanism at the rotor hub when the measured tracking is not within the plurality of specified operational parameters to change a pitch of each individual blade individually to adjust the tracking of each individual blade individually while the rotor is spinning; and
   wherein the processor comprises a non-transitory computer readable medium for automatically adjusting a tracking of each individual blade of the one or more blades, comprising instructions stored thereon, that when executed by a computer having a communications interface, performs the step of adjusting the tracking of each individual blade individually during flight or service.

2. The apparatus of claim 1, wherein the processor is a flight control computer.

3. The apparatus of claim 1, wherein the blade tracking adjustment mechanism is permanently attached to the aircraft.

4. The apparatus of claim 1, wherein the aircraft is a helicopter, a rotorcraft, or a vertical take off and landing rotorcraft.

5. The apparatus of claim 1, further comprising a dynamic rotor balance system communicably coupled to the processor, wherein the dynamic rotor system balance system balances the one or more blades automatically.

6. The apparatus of claim 1, wherein the blade tracking adjustment mechanism is a rotor analysis and diagnostic system.

7. The apparatus of claim 1, further comprising a static rotor balance system capable of adjusting the balance of a blade of the one or more blades prior to installation and tracking and balance of the blade.

8. The apparatus of claim 1, further comprising a hub balance adjustment mechanism communicably coupled to the processor, wherein the hub balance adjustment mechanism balances at least one of the one or more blades.

9. A method for automatically adjusting a tracking of one or more blades, the method comprising:
   providing a blade tracking adjustment mechanism connected to each individual blade of the one or more blades, wherein the blade tracking adjustment mechanism is communicably connected to a respective eccentric pitch horn clevis that is connected to a rotor hub, wherein each individual blade is connected to the rotor hub by the respective eccentric pitch horn clevis, wherein each respective eccentric pitch horn clevis is rotated to create an effectively shorter or longer pitch link length to change a pitch to adjust a tracking of each individual blade, a blade tracking measurement system communicably coupled to the blade tracking adjustment mechanism, and a processor communicably coupled to the blade tracking measurement system and the blade tracking adjustment system, and a hub balancing system connected to a blade balancing system that is communicably coupled to the processor;
   measuring the tracking of each individual blade of the one or more blades using the blade tracking measurement system;
   determining whether a measured tracking of each individual blade of the one or more blades is within a plurality of tracking operational parameters using the processor, wherein the plurality of tracking operational parameters includes tracking operational parameters that define a desired out-of-track condition for at least one individual blade of the one or more blades;
   adjusting the tracking of each individual blade individually during flight or service;
   adjusting the tracking of each individual blade individually at the rotor hub when the measured tracking is not within the plurality of tracking operational parameters;
   determining whether a measured balance of each individual blade of the one or more blades is within one or more balance operational parameters using the processor;
   adjusting the balance of each blade when the measured balance is not within the one or more balance operational parameters; and
   changing at least one of:
      the pitch of each individual blade individually with the blade tracking adjustment mechanism based on an output received from the processor; or
      the balance of each individual blade individually with the blade balancing system based on an output received from the processor while the rotor is spinning.

10. A non-transitory computer readable medium for automatically adjusting a tracking of one or more blades, comprising instructions stored thereon, that when executed by a computer having a communications interface, one or more databases and one or more processors communicably coupled to the interface and one or more databases, perform the steps comprising:
  providing a blade tracking adjustment mechanism connected to each individual blade of the one or more blades, wherein the blade tracking adjustment mechanism is communicably connected to a respective eccentric pitch horn clevis which is connected to a rotor hub, wherein each individual blade is connected to the rotor hub by the respective eccentric pitch horn clevis, wherein each respective eccentric pitch horn clevis is rotated to create an effectively shorter or longer pitch link length to change a pitch to adjust a tracking of each individual blade an electric motor, a blade tracking measurement system communicably coupled to the blade tracking adjustment mechanism, and a processor communicably coupled to the blade tracking measurement system and the blade tracking adjustment system;
  measuring the tracking of each individual blade of the one or more blades using the blade tracking measurement system;
  determining whether a measured tracking of each individual blade of the one or more blades is within a plurality of specified operational parameters using the processor, wherein the plurality of specified operational parameters includes specified operational parameters that define a desired out-of-track condition for at least one individual blade of the one or more blades;
  adjusting the tracking of each individual blade individually during flight or service;
  adjusting the tracking of each individual blade individually at the rotor hub when the measured tracking is not within the plurality of specified operational parameters; and
  changing the pitch of each individual blade individually with the blade tracking adjustment mechanism based on an output received from the processor while the rotor is spinning.

11. A method for automatically adjusting a tracking of one or more blades of an aircraft, the method comprising:
  providing a blade tracking adjustment mechanism connected that is connected to each individual blade of the one or more blades by a respective eccentric pitch horn clevis, a blade tracking measurement system communicably coupled to the blade tracking adjustment mechanism, wherein the blade tracking adjustment mechanism is communicably connected to a rotor hub, and wherein each individual blade of the one or more blades is connected to the rotor hub by the respective eccentric pitch horn clevis, wherein each respective eccentric pitch horn clevis is rotated to create an effectively shorter or longer pitch link length to change a pitch to adjust a tracking of each individual blade, and a processor communicably coupled to the blade tracking measurement system and the blade tracking adjustment system;
  measuring the tracking of each individual blade of the one or more blades using the blade tracking measurement system;
  determining whether a measured tracking of each individual blade of the one or more blades is within a plurality of specified operational parameters using the processor, wherein the plurality of specified operational parameters includes specified operational parameters that define a desired out-of-track condition for at least one individual blade of the one or more blades;
  adjusting the tracking of each individual blade individually during flight or service to account for bearing wear;
  adjusting the tracking of each individual blade individually when the measured tracking is not within the plurality of specified operational parameters; and
  changing the pitch of each individual blade individually with the blade tracking adjustment mechanism at the rotor hub based on an output received from the processor while the rotor is spinning.

12. The method of claim 11, wherein the processor is a flight control computer.

13. The method of claim 11, further comprising permanently attaching the blade tracking adjustment mechanism to the aircraft.

14. The method of claim 11, wherein the aircraft is a helicopter, a rotorcraft, or a vertical take off and landing rotorcraft.

15. The method of claim 11, further comprising balancing the one or more blades automatically with a dynamic rotor balance system communicably coupled to the processor.

16. The method of claim 11, wherein the blade tracking adjustment mechanism is a rotor analysis and diagnostic system.

17. The method of claim 11, further comprising adjusting the balance of a blade of the one or more blades with a static rotor balance system prior to installation and tracking and balance of the blade after installation.

18. The method of claim 11, further comprising adjusting a hub balance with a hub balance adjustment mechanism communicably coupled to the processor, wherein the hub balance adjustment mechanism balances the one or more blades.

* * * * *